July 14, 1925.

R. E. KLAGES

DRAG LINK

Filed Feb. 28, 1923

1,545,563

Inventor
Reynold E. Klages
By his Attorneys

Patented July 14, 1925.

1,545,563

UNITED STATES PATENT OFFICE.

REYNOLD E. KLAGES, OF COLUMBUS, OHIO.

DRAG LINK.

Application filed February 28, 1923. Serial No. 621,882.

*To all whom it may concern:*

Be it known that I, REYNOLD E. KLAGES, a citizen of the United States of America, and a resident of Columbus, county of Franklin, and State of Ohio, have invented certain new and useful Improvements in Drag Links, of which the following is a full, clear, concise, and exact description, such as will enable others skilled in the art to which the invention relates to make and use the same, reference being made therein to the accompanying drawings which form a part of this specification.

This invention relates to drag links and has for its object the provision of a link that is cheap to manufacture, easily assembled, strong, durable, and is not likely to bend, break or become disrupted by the stresses and strains incident to the operation of the vehicle on which it is employed.

On the drawings, Figure 1 is an elevational view of a drag link with parts broken away.

Figure 1:
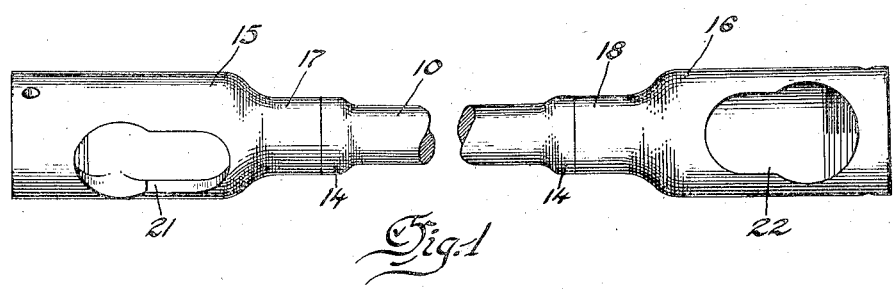
Figure 2:
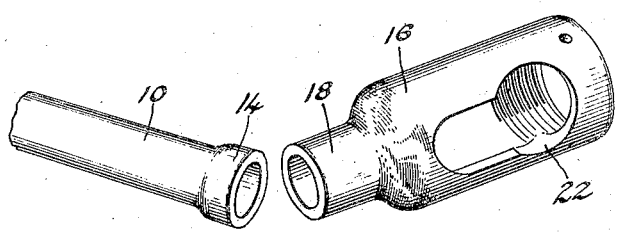
Figure 2 is a perspective view of the body and end portions of one end of the link showing the parts disconnected.
Figure 3:
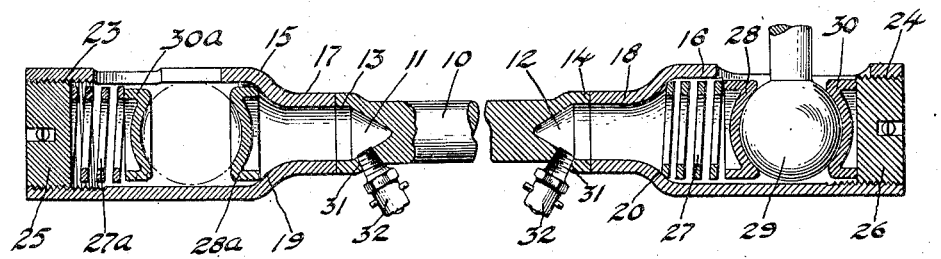
Figure 3 is a sectional view of a link with parts in elevation and parts broken away.

In the manufacture of drag links it is common practice to form the link from a tubular member. In some instances, a tube of the proper diameter for the outer ends of the link is cut to the desired length and the central or body portion of the link is reduced or swaged to provide shoulders against which a bearing or spring may abut. In other instances, a tube of the desired diameter is cut to proper length and the ends of the tube are expanded to form enlarged chambers for the reception of springs and bearings as is usual in such constructions. Links of this type are more or less expensive to manufacture. In the present device the body portion of the link is made from a solid rod and the enlarged ends are secured to the rod in any suitable manner. By using a solid rod for the body portion, a link may be produced with less expense than the tubular link and in many instances is preferable to the more costly one.

Referring now to the drawings, the reference numeral 10 indicates the body portion of the link which is made from a solid rod. The end portions of the rod are expanded as shown at 11 and 12 to form the continuous or attaching walls 13 and 14.

The end or tubular portions 15 and 16 of the drag link are formed from tubular members. They have their inner ends reduced or swaged as at 17 and 18 to form the shoulders 19 and 20. The diameters of the body and end portions are so proportioned that when the one is expanded to form the attaching wall and the other swaged to form the reduced portion the attaching wall and the reduced portion are, if circular, of substantially the same diameter and the walls are of substantially the same thickness whereby welding is facilitated and the weld has maximum strength. The reduced portions 17 and 18 are secured to the walls 13 and 14 in any suitable manner as by welding.

The end portions 15 and 16 are provided with the key hole slots 21 and 22 for the reception of the balls of the steering mechanism as is usual in such constructions. The outer ends of the link are provided with the internal screw threads 23 and 24 for the reception of the screw threaded plugs 25 and 26. The enlarged end 16 is provided with the spring 27, which is adapted to engage the shoulder 20 and against which the bearing 28 is adapted to abut. One side of the ball 29 of the steering arm is adapted to engage the bearing 28, while the bearing 30 which rests against the plug 26 engages the opposite side of said ball. The opposite end of the link differs from the one just described in that the spring $27^a$ is interposed between the plug 25 and the bearing $30^a$, instead of between the shoulder 19 and the bearing $28^a$, all of which is usual in such constructions.

By employing a tapered tool in forming the recesses in the ends of the rod or body portion of the link the inner portions of the attaching walls are thick enough where perforated as shown at 31 to afford a sufficient number of screw threads to support the grease cups 32. In other words, it is not necessary to form bosses on the attaching walls in order to attach the grease cups as in the usual construction.

Figure 4:
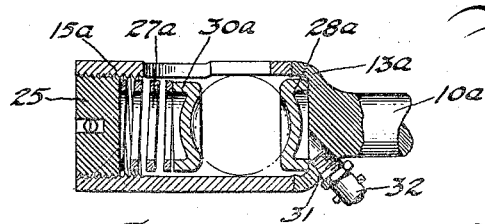
Figure 4 is a sectional view of part of a modified form.

The form shown in Figure 4 differs from that described above, in that tube $15^a$ is not swaged, rod $10^a$ being expanded at its end to provide an attaching wall $13^a$ equal in diameter to tube $15^a$, and which is welded to the tube. The grease cup 32 is placed in the thickened portion of wall 13ª as will be understood.

It will thus be seen that by making the body portion of the link from a solid rod the cost of material is less than where tubular rods are employed for this purpose and that by enlarging the ends of the rod suitable tubular end portions may be welded thereto.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim:

1. In a device of the class described, a solid body portion having the ends thereof expanded to form a circular wall, end portions each having a reduced end, said reduced ends being welded to said circular walls.

2. In a device of the class described, a solid rod having its ends expanded to form attaching walls, tubular end portions, each having one end reduced to the diameter of the corresponding attaching wall and welded thereto, the adjoining walls of the weld being of substantially the same thickness.

3. In a device of the class described, a solid body portion having an enlarged end forming a circular wall and a tubular body portion having a reduced end welded to said circular wall said body and end portions being so proportioned in diameters that when the one is expanded and the other reduced the welded walls will be of substantially the same diameter and thickness.

In testimony whereof I affix my signature.

REYNOLD E. KLAGES.